(12) United States Patent
Mladenov et al.

(10) Patent No.: US 9,813,321 B2
(45) Date of Patent: Nov. 7, 2017

(54) HYBRID CONTENT DELIVERY SYSTEM

(71) Applicant: VIBLAST OOD, Sofia (BG)

(72) Inventors: Svetlin Detelinov Mladenov, Novi Iskar (BG); Nikolay Emilov Dimitrov, Sofia (BG)

(73) Assignee: VIBLAST OOD, Sofia (BG)

( * ) Notice: Subject to any disclaimer, the term of this patent is extended or adjusted under 35 U.S.C. 154(b) by 348 days.

(21) Appl. No.: 14/503,999

(22) Filed: Oct. 1, 2014

(65) Prior Publication Data
US 2016/0099855 A1 Apr. 7, 2016

(51) Int. Cl.
*H04L 12/26* (2006.01)
*H04L 29/06* (2006.01)
*H04L 29/08* (2006.01)

(52) U.S. Cl.
CPC ........ *H04L 43/0888* (2013.01); *H04L 65/608* (2013.01); *H04L 67/104* (2013.01); *H04L 43/0876* (2013.01)

(58) Field of Classification Search
CPC .. H04L 43/0888; H04L 67/104; H04L 65/608
See application file for complete search history.

(56) References Cited

U.S. PATENT DOCUMENTS

| | | | |
|---|---|---|---|
| 2011/0179146 A1* | 7/2011 | Park | H04L 12/2809 709/219 |
| 2014/0250206 A1* | 9/2014 | Jang | H04N 21/4122 709/217 |
| 2016/0088079 A1* | 3/2016 | Mathur | H04L 65/4084 709/217 |

* cited by examiner

*Primary Examiner* — Kim T Nguyen
(74) *Attorney, Agent, or Firm* — Moritt Hock & Hamroff LLP; Steven S. Rubin, Esq.

(57) ABSTRACT

Methods and systems for delivering content are generally described. In an example, a processor may receive a first request from a first device. The first request may be a request for the content. The processor may further send at least a first chunk of content data to the first device. The content data may be associated with the content. The processor may further receive a second request from a second device. The second request may be for the content. The processor may further send an identification of the first device to the second device. The processor may further send an instruction to the second device. The instruction may be effective to establish a communication channel between the first device and the second device in order for a second chunk of the content data to be sent from the first device to the second device through the communication channel.

20 Claims, 4 Drawing Sheets

HYBRID CONTENT DELIVERY SYSTEM

BACKGROUND

Unless otherwise indicated herein, the materials described in this section are not prior art to the claims in this application and are not admitted to be prior art by inclusion in this section.

Owners of content, such as live streaming events, may employ a content delivery network to distribute the content to users who wish to view the content. In some examples, the content delivery network may distribute content data associated with the content over a network. Users may use devices such as computers or mobile devices, which may be connected to the network, to receive the content data in order to view the content.

SUMMARY

In some examples, methods for delivering content are generally described. The methods may include receiving, by a processor, a first request from a first device. The first request may be a request for the content. The methods may further include sending, by the processor, at least a first chunk of content data to the first device. The content data may be associated with the content. The methods may further include receiving, by the processor, a second request from a second device. The second request may be a request for the content. The methods may further include sending, by the processor, an identification of the first device to the second device. The methods may further include sending, by the processor, an instruction to the second device. The instruction may be effective to establish a communication channel between the first device and the second device in order for a second chunk of the content data to be sent from the first device to the second device through the communication channel.

In some examples, systems effective to deliver content are generally described. The systems may include a memory configured to store content data, which may be associated with the content. The memory may be further configured to store an instruction, which may be associated with an establishment of a communication channel between a first device and a second device. The systems may further include a processor, which may be configured to be in communication with the memory. The systems may further include a module, which may be configured to be in communication with the processor. The module may be configured to receive a first request from the first device. The first request may be a request for the content. The module may be configured to instruct the processor to send at least a first chunk of the content data to the first device. The module may be further configured to receive a second request from the second device. The second request may be a request for the content. The module may be further configured to send an identification of the first device to the second device. The module may be further configured to send the instruction to the second device in order for a second chunk of the content data to be sent from the first device to the second device through the communication channel.

In some examples, methods for retrieving content are generally described. The methods may include sending, by a first device, a first request to a processor. The first request may be a request for the content. The methods may further include receiving, by the first device, an identification of a second device from the processor. The methods may further include receiving, by the first device, an instruction from the processor. The instruction may be effective to establish a communication channel between the first device and the second device. The methods may further include receiving, by the first device, a first chunk of content data from the processor. The content data may be associated with the content. The methods may further include establishing, by the first device, the communication channel between the first device and the second device. The methods may further include sending, by the first device, a second request to the second device through the communication channel. The second request may be a request for device data associated with the second device. The methods may further include receiving, by the first device, the device data from the second device. The methods may further include, determining, by the first device, whether to request a second chunk of content data from the second device, or receive the second chunk of content data from the processor, based on the device data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 1:
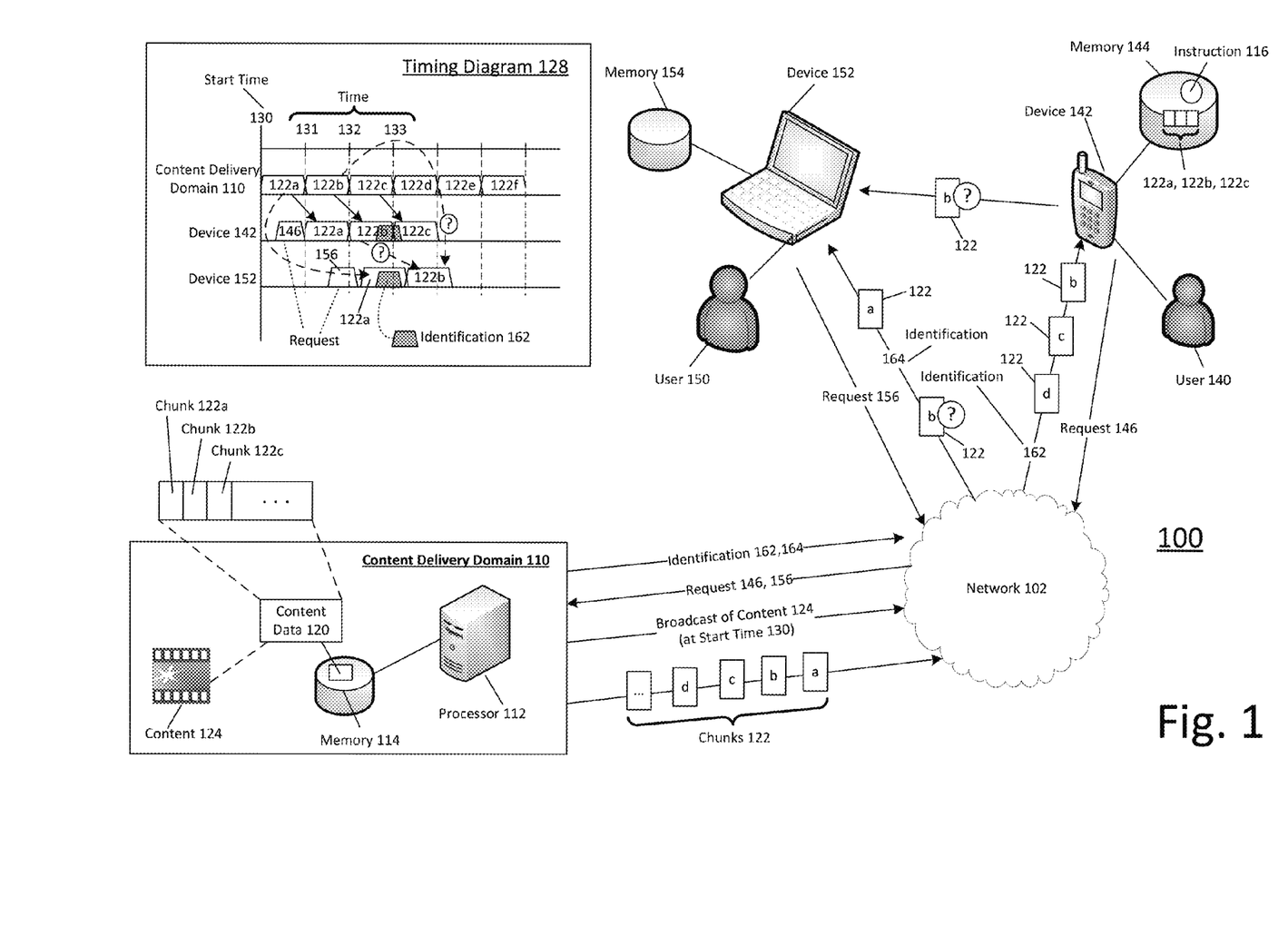
FIG. 1 illustrates an example system that can be utilized to implement a hybrid content delivery system.

FIG. 1 illustrates an example system 100 that can be utilized to implement a hybrid content delivery system, arranged in accordance with at least some embodiments described herein. System 100 may be a hybrid content delivery system, which may be implemented with a content delivery domain 110. Content delivery domain 110 may store content data 120, which may be associated with content 124 such as a video. Content delivery domain 110 may be configured to deliver content 124, such as by distributing content 124, to one or more devices through a network 102, such as the Internet. As will be described in more detail below, during the delivery of content 124, devices 142, 152 may receive chunks of content data 120 from each other, or from other devices connected to network 102, or from content delivery domain 110. For example, device 152 may receive a first chunk of content data 120 from content delivery domain 110, and may receive a second chunk of content data 120 from device 142 during the delivery of content 124.

Content delivery domain 110 may include a processor 112 and/or a memory 114, configured to be in communication with each other. Memory 114 may be configured to store content data 120. Content data 120 may be divided, such as by processor 112, into one or more chunks 122, where each chunk 122 may include a same or a different amount of data. Each chunk 122 may correspond to a respective portion of content 124. For example, content 124 may be a video of a duration of twenty minutes. Each chunk 122 may correspond to twenty seconds of content 124, which may result in content data 120 including sixty chunks. Processor 112 may be configured to determine a duration of a corresponding portion of content 124 for each chunk 122, which may affect the amount of data in each chunk 122. Each chunk 122 may be delivered, by content delivery domain 110, individually among content delivery domain 110 and/or devices 142, 152.

In an example illustrated by timing diagram 128, content delivery domain 110 may start a distribution of content 124 at a start time 130. Content delivery domain 110 may distribution content 124 by distributing each chunk among chunks 122 sequentially over network 102. In the example, at a time between start time 130 and a time 131, a user 140 may wish to view content 124 with use of device 142. Device 142 may be a device such as a computer or cellular phone and may include a memory 144. User 140 may use device 142 to connect to network 102 and in response, device 142 may generate a request 146 for content 124. In some examples, user 140 may input a uniform resource locator (URL) in a browser application installed in device 142 to generate request 146. Device 142 may send a request 146 to content delivery domain 110 through network 102, where request 146 may be a request for content data 120. Device 142 may receive chunks of content data 120 which may be being distributed by content delivery domain 110 over network 102. In the example, request 146 may be a request to start viewing content 124 from a beginning of content 124. Processor 112, at time 131, may begin to send chunks 122 sequentially, starting with chunk 122a, to device 142. Device 142 may continue to receive chunks 122 of content data 120 through network 102. In the example, in response to receiving chunks 122a, 122b, 122c, device 142 may store chunks 122a, 122b, 122c in memory 144. In some examples, if request 146 is a request to view the live broadcast of content 124, device 142 may first receive chunk 122b, instead of chunk 122a, from processor 112 starting at time 131.

In the example, at a time between time 131 and a time 132, a user 150 may wish to view content 124 with use of device 152. Device 152 may be a device such as a computer or cellular phone and may include a memory 154. User 150 may use device 152 to connect to network 102 and in response, generate a request 156 for content 124. In some examples, user 150 may input a uniform resource locator (URL) in a browser application installed in device 152 to generate request 156. Device 152 may send a request 156 to content delivery network 110 through network 102, where request 156 may be a request for content data 120. In the example, request 156 may be a request to start viewing content 124 from a beginning of content 124. Processor 112, at a time between time 132 and time 133, may begin to send chunks 122 sequentially, starting with chunk 122a, to device 142. In some examples, if request 156 is a request to view the live broadcast of content 124, device 142 may first receive chunk 122d from processor 112 starting at a time between time 132 and time 133.

Content delivery domain 110 may detect that more than one device is connected to network 102, such as by determining a presence of more than one request received at content delivery domain 110. In response to detecting more than one device are connected to network 102, content delivery domain 110 may send an identification 162 to device 142, and may send an identification 164 to device 152, at a time between time 132 and time 133. Identification 162 and identification 164 may each include identifications of one or more devices which are connected to network 102. In the example, identification 162 may include an identification of device 152, and identification 164 may include an identification of device 142. Device 152 may receive identification 162 and may determine (as illustrated by the question mark "?") whether to establish a communication channel (described below) to request chunks 122 of content data 120 from device 142, or to continue to receive chunks from content delivery domain 110.

Figure 2:
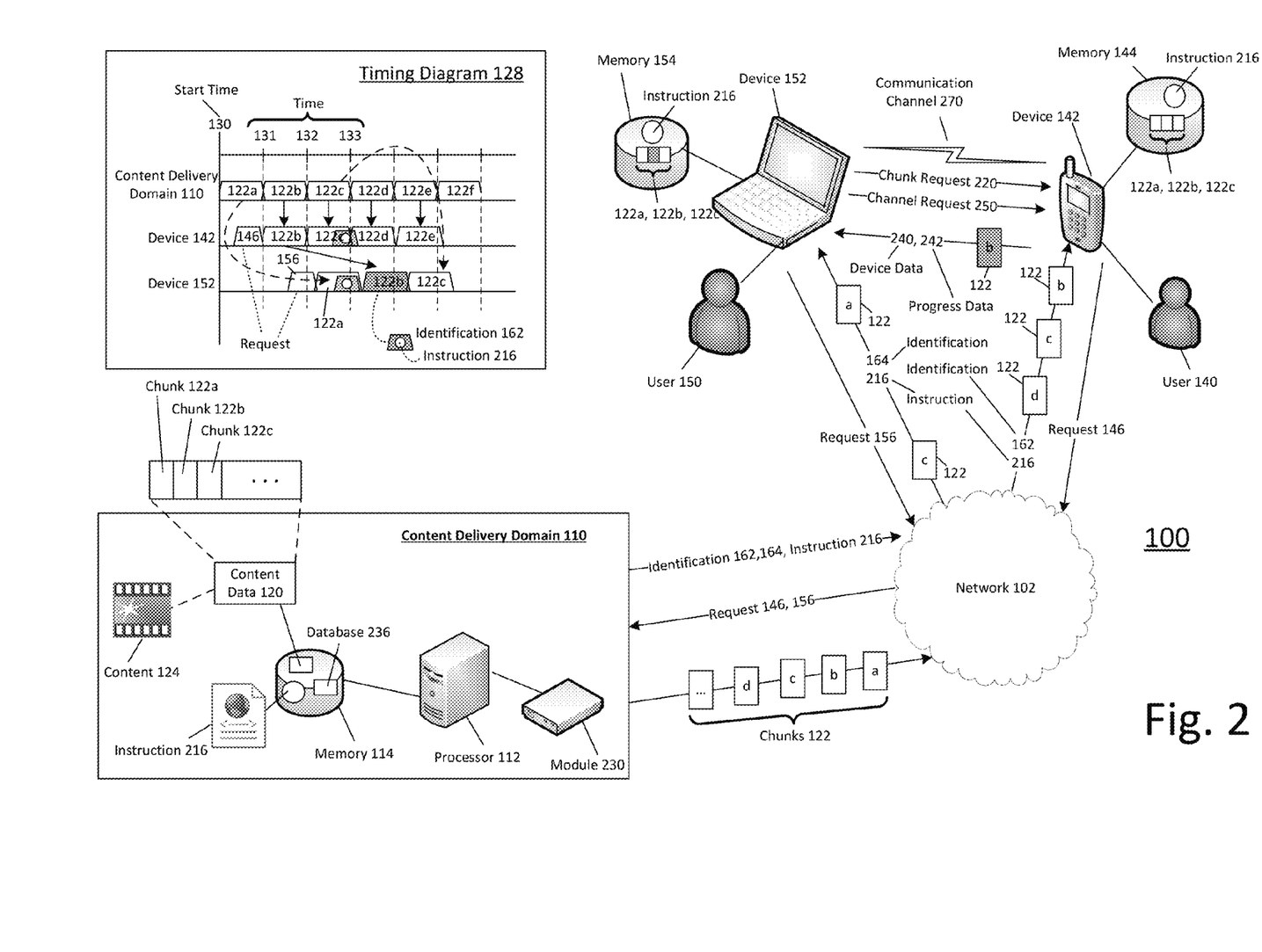
FIG. 2 illustrates the example system of FIG. 1 with additional detail relating to an implementation of a hybrid content delivery system.

FIG. 2 illustrates the example system 100 of FIG. 1 with additional detail relating to an implementation of hybrid content delivery system, arranged in accordance with at least some embodiments described herein. FIG. 2 includes elements in FIG. 1, with additional details. Those elements in FIG. 2 that are labeled identically to elements of FIG. 1 will not be described again for the purposes of clarity.

Content delivery domain 110 may further include a module 230, which may be configured to be in communication with processor 112 and/or memory 114. In some examples, module 230 may be a component of processor 112. In some examples, module 230 may be an integrated circuit such as FPGA (Field Programmable Gate Array), SoC (System on a Chip), etc. Memory 114 may be further configured to store an instruction 216 and a database 236, where instruction 216 may be associated with establishment of a communication channel 270 among devices connected to network 102 (such as devices 142, 152). In some examples, memory 144 of device 142, and memory 154 or device 152, may be further configured to store instruction 216 prior to an implementation of system 100. Database 236 may include indications of devices which may be connected to network 102. In some examples, database 236 may further include indications of receiving times of requests, such as requests 146, 156, received from devices indicated by database 236. In some examples, database 236 may be stored in a memory different from memory 114. In some examples, module 230 may be further configured to instruct processor 112 to update database 236.

In the example, module 230 may receive request 146 from device 142 and in response, may analyze database 236 to generate identifications 162, 164. Module 230 may determine an absence of connected devices (to network 102)

indicated by database 236 and in response, may instruct processor 112 to continue to send chunks 122 to device 142. In some examples, in response to the absence of connected devices (to network 102), module 230 may send a message to suggest device 142 to continue to retrieve chunks 122 from content delivery domain 110. Continuing with the example, module 230 may receive request 156 and in response, may analyze database 236 to generate and/or update identifications 162, 164. Database 236 may indicate that device 142 is currently connected to network 102 and is currently receiving chunks 122 from content delivery domain 110. Module 230 may update database 236, based on request 146, to indicate that device 152 is connected to network 102. Module 230 may generate identification 162 to include an identification of device 152 and in response, may send identification 162 to device 142. Identification 162 may be effective to indicate that there may be devices different from device 142 connected to network 102. Instruction 216, stored in memory 144, may be effective to indicate that device 142 may send requests to devices indicated by identification 162 for chunks 122. Similarly, module 230 may generate identification 164 to include an identification of device 142 and in response, may send identification 164 to device 142. Identification 164 may be effective to indicate that there may be devices different from device 152 connected to network 102. Instruction 216, stored in memory 154, may be effective to indicate that device 152 may send requests to devices indicated by identification 164, for chunks 122. Module 230 may further instruct processor 112 to send chunk 122a to device 152. In some examples, module 230 may determine a difference between a first receiving time of request 146 and a second receiving time of request 156. If the difference between the receiving times is within a threshold, for example thirty seconds, then module 230 may include the identification of device 142 in identification 162. If the difference between the receiving times exceeds 30 seconds, module 230 may exclude the identification of device 142 from identification 162.

Device 142 may receive identification 162, and instruction 216, and in response, may store instruction 216 in memory 144. Similarly, devices 152 may receive identification 164, and instruction 216, and in response, may store instruction 216 in memory 154. In examples where instruction 216 may be stored in memory 144, 154 prior to the implementation of system 100, devices 142, 152 may receive identification 162, 164, respectively. In the example, in response to receipt of identification 164, device 152 may execute instruction 216, which may cause device 152 to send a channel request 250 to device 142. Channel request 250 may be a request to establish a communication channel 270 between device 152 and device 142. In some examples, communication channel 270 may be based on the WEBRTC (Web Real-Time Communication) protocol. Device 142 may receive channel request 250 and may analyze identification 162 received from module 230. Device 142 may determine that device 152 is identified by identification 162 and based on instruction 216 stored in memory 144, may facilitate establishment of communication channel 270 between device 152 and device 142. In response to the establishment of communication channel 270, device 142 may send device data 240 and progress data 242 to device 152.

Device data 240 may include information related to device 142 such as a location of device 142, a hardware profile of device 142, a performance of device 142, a quality value related to content 124, etc. The location of device 142 may indicate a particular city, town, state, province, etc. The hardware profile of device 142 may indicate models of processors, memory, network modules, etc., of device 142. The performance of device 142 may be related to processing speed, data transmission speed, available bandwidth, etc., of device 142. The quality value may be a resolution of content 124 such as whether content 124 is being display on device 142 in particular high definition video mode such as 720p, 1080p, etc. Progress data 242 may be effective to indicate a progress of display of content 124 on device 142. For example, progress 242 may indicate that when device 142 receives request 250, device 142 is displaying a fifty-third second of content 124. Progress data 242 may indicate "53 seconds", which may be an indication that device 142 may be storing at least three chunks 122, where each chunk corresponds to twenty seconds of content 124. As will be described in more detail below, device 152 may determine whether to receive chunks 122 from device 152 based on device data 240 and/or progress data 242.

In some examples, device 152 may execute instruction 216 during a display of content 124 on device 142, and/or during a display of content 124 on device 152, in order to determine whether to request chunks 122 from device 142. In response to receiving device data 240 and/or progress data 242 from device 142, device 152 may analyze device data 240 and/or progress data 242. Device 152, based on the analysis of device data 240, may determine that device 142 is located in a same city as device 152. In response to the determination of the location of device 142, device 152 may determine to request chunks 122 from device 142. In some examples, device 152 may execute instruction 216 to sort IP (Internet Protocol) addresses of devices indicated by identification 164 or device data 240, and in response, identify devices of particular IP addresses, and request chunks 122 from the identified devices. In some examples, device 152 may collect device data 240 from device 142 over a period of time, and may determine to request chunks 122 from device 142 based on parameters such as a network throughput, latency, data transmission rate, etc., within the period of time. For example, device 152 may determine that an exchange of chunks 122 with device 142 within a past 10 minutes has a relatively low latency, and may determine to continue requesting chunks 122 from device 142.

Device 152 may analyze progress data 242 to determine a number of chunks 122 to request from device 142. In the example, in response to progress data 242 indicating storage of at least three chunks (122a, 122b, 22c), device 152 may request at least one, or at most three, chunks 122 from device 142. Device 152 may send a chunk request 220 to device 142 through communication channel 270, where chunk request 220 may be a request for the determined number of chunks, such as one chunk (twenty seconds of content 124), i.e. chunk 122b, from device 142. Device 142 may receive chunk request 220 and in response, may send chunk 122b to device 152 through communication channel 270. Device 152 may continue to determine whether to request missing (chunks not stored in memory 154) chunks 122, such as chunk 122c, from device 142, or to continue to receive chunks 122 from content delivery domain 110. In the example, device 152 may determine to receive chunk 122c from content delivery domain 110. Device 152 may store chunks 122a, 122b, 122c, in memory 154. In some examples, device 152 may flag chunk 122b as a chunk which is received from a device instead of content delivery domain 110.

Figure 3:
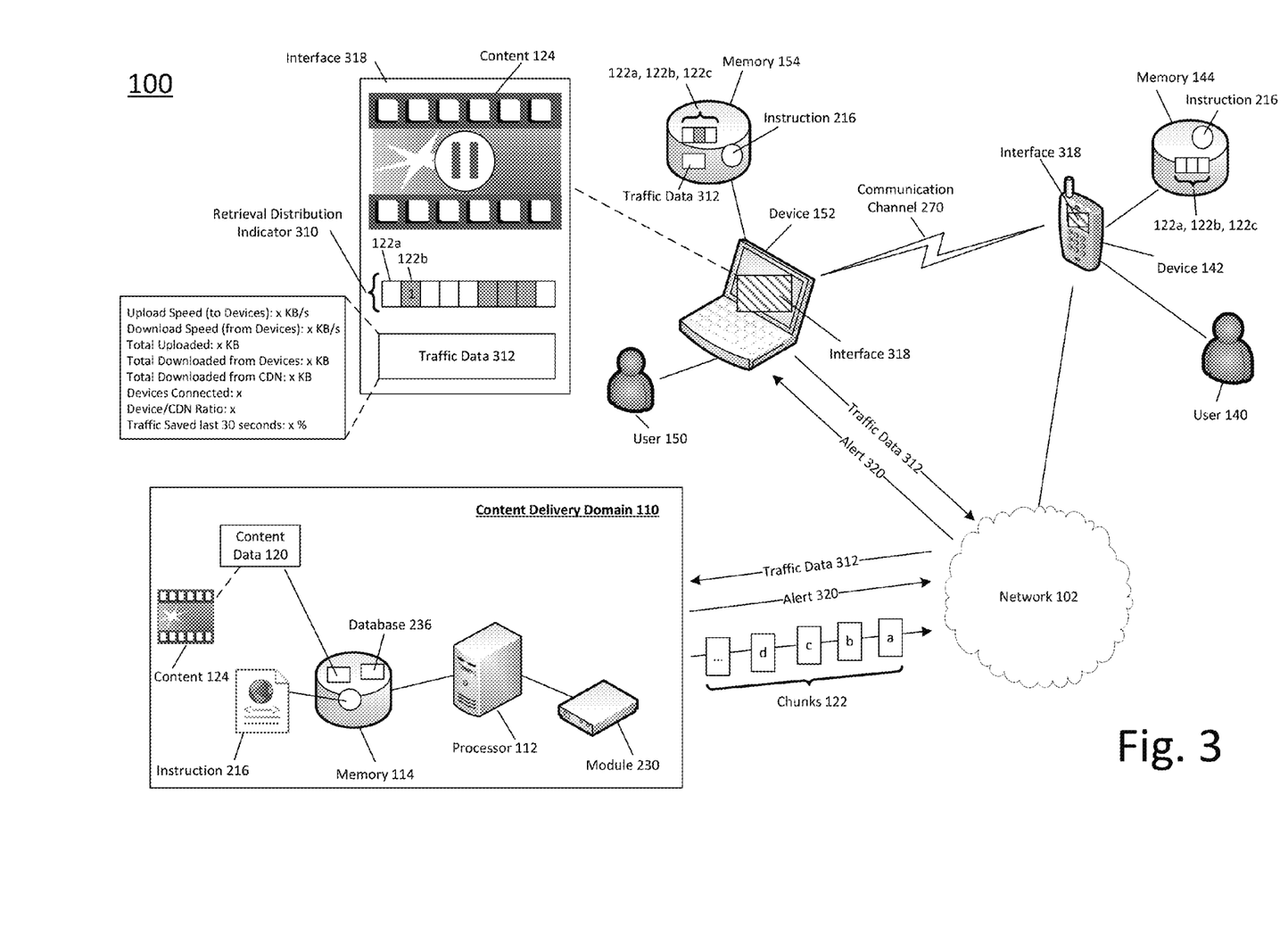
FIG. 3 illustrates the example system 100 of FIG. 1 with additional detail relating to monitoring of a hybrid content delivery system.

FIG. 3 illustrates the example system 100 of FIG. 1 with additional detail relating to monitoring of a hybrid content delivery system, arranged in accordance with at least some embodiments described herein. FIG. 3 includes elements in FIG. 1, with additional details. Those elements in FIG. 3 that are labeled identically to elements of FIG. 1 will not be described again for the purposes of clarity.

As will be described in more detail below, module 230 may be further configured to monitor system 100 based on traffic data 312. Each device connected to network 102, such as devices 142, 152, may generate respective traffic data 312. Traffic data 312 may include indications of an upload speed, a download speed, a number of devices connected, etc. As a result of the monitoring, module 230 may send an alert 320 to device 152, where alert 320 may indicate an undesirable performance of system 100. Device 152 may determine whether to continue to request chunks 122 from device 142 based on alert 320.

In the example, device 152 may generate traffic data 312 based on transmissions of chunks 122 between device 152 and device 142, or between device 152 and content delivery domain 110. For example, chunks 122a, 122b, 122c, 122d, may include 5,000 kilobytes, 3,500 kilobytes, 4,000 kilobytes, and 2,500 kilobytes, of data respectively. After device 152 received chunks 122a from content delivery domain 110, device 152 may update traffic data 312 to indicate that a total of 5,000 kilobytes of data has been downloaded from content delivery domain 110. After device 152 received chunk 122b from device 142, device 152 may update traffic data 312 to indicate that a total of 3,500 kilobytes of data has been downloaded from a device connected to network 102. After device 152 received chunks 122c, 122d from content delivery domain 110, device 152 may update traffic data 312 to indicate that a total of 11,500 (5,000+4,000+2,500) kilobytes of data has been downloaded from content delivery domain 110 through network 102.

In an example, device 152 may send traffic data 312 to content delivery domain 110 periodically. Module 230 may analyze traffic data 312 to monitor system 100, and may generate alert 320 based on the analysis. For example, traffic data 312 may indicate that device 152 is receiving chunks 122 from device 142 at a download speed of 3,000 kilobytes per second. Module 230 may compare the download speed indicated by traffic data 312 with a threshold speed, such as 5,000 kilobytes per second, which may be stored in memory 114. In response to traffic data 312 indicating a download speed lower than the stored threshold speed, module 230 may generate alert 320 to indicate that the download speed indicated by traffic data 312 is below the threshold download speed, and may send alert 320 to device 152. Device 152 may receive alert 320 and in response, may determine whether to continue to request chunks 122 from device 142 or to receive chunks from content delivery domain 110. In some examples, device 152 may be configured to execute instruction 216, stored in memory 154, to determine whether to continue to request chunks 122 from device 142 or to receive chunks from content delivery domain 110. In some examples, device 152 may receive instruction 216 from module 230, where instruction 216 may be further effective to instruct device 152 to analyze traffic data 312. Device 152, based on the analysis of traffic data 312, may determine whether to establish communication channel 270 with device 142 in order to receive chunks 122 from device 142. In some examples, device 152, based on the analysis of traffic data 312, may determine whether to request chunks 122 from device 142, or to receive chunks 122 from module 230.

In an example, device 152 may send chunks 122 stored in memory 154 to more than one device. Module 230 may analyze traffic data 312 to determine how many devices are receiving chunks 122 from device 152. Module 230 may be further configured to set a limit on the number of devices that may receive chunks from device 152. For example, module 230 may set a limit of four devices which may receive chunks 122 from device 152. If traffic data 312 indicates that device 152 is sending chunks to four devices, module 230 may generate alert 320 to indicate that the maximum amount of devices receiving chunks 122 from device 152 has been reached. Module 230 may send alert 320 to device 152. Device 152 may receive alert 320 and in response, may determine whether to allow additional devices to establish communication channel 270 with device 152, and/or to receive chunks 122 from device 152. In some examples, device 152 may be configured to execute instruction 216, stored in memory 152, to determine whether to allow additional devices to establish communication channel 270 with device 152, and/or to receive chunks 122 from device 152.

Display of content 124 on devices 142, 152 may be facilitated by an interface 318. In some examples, interface 318 may be an output of an application such as a white-labeled video player application. In some examples, interface 318 may be an output of a web browser application. In examples where interface 318 may be an application of a cellular phone, instruction 216 may be a library which may be embedded in a cellular phone application. Interface 318 may be further effective to display content 124 and to display traffic data 312. In the example, interface 318 may include a retrieval distribution indicator 310, which may be a graphical indicator effective to indicate, such as by color or shading, whether each chunk 122 is received from content delivery domain 110, or from a device through communication channel 270. In some examples, retrieval distribution indicator 310 may further indicate a device from where each chunk 122 is received. For example, if device 152 established communication channel 270 with a first device and with a second device, retrieval distribution indicator 310 may indicate whether a chunk is received from the first device or the second device. In the example, retrieval distribution indicator 310 may indicate that chunk 122b may be received from the first device (labeled as "1"). In some examples, retrieval distribution indicator may be effective to indicate how many times a respective chunk has been distributed to another device. For example, if chunk 122b has been distributed to two devices, retrieval distribution indicator 310 may show a number "2".

Among other possible benefits, a system implemented in accordance with the disclosure may benefit content providers, content delivery networks, and users who wish to view a live broadcast or live streaming content. The system may benefit content providers by reducing a need to purchase huge amounts of resources from content delivery networks. The system may also benefit content providers by improving a distribution efficiency of content and may benefit content delivery networks by alleviating the load on the resources of content delivery networks. A reduced load on the resources of content delivery networks may reduce a risk of damaging the resources, which may be costly to fix. The system may also benefit users who which to view a live broadcast by providing additional sources, such as a peer-to-peer network, of the content. Users who are viewing a live event through a network such as the Internet, may download different parts of the content from both the content delivery network and other devices that are showing the same content. The additional source of content during a live event may allow the user to view the content without interruptions.

Figure 4:
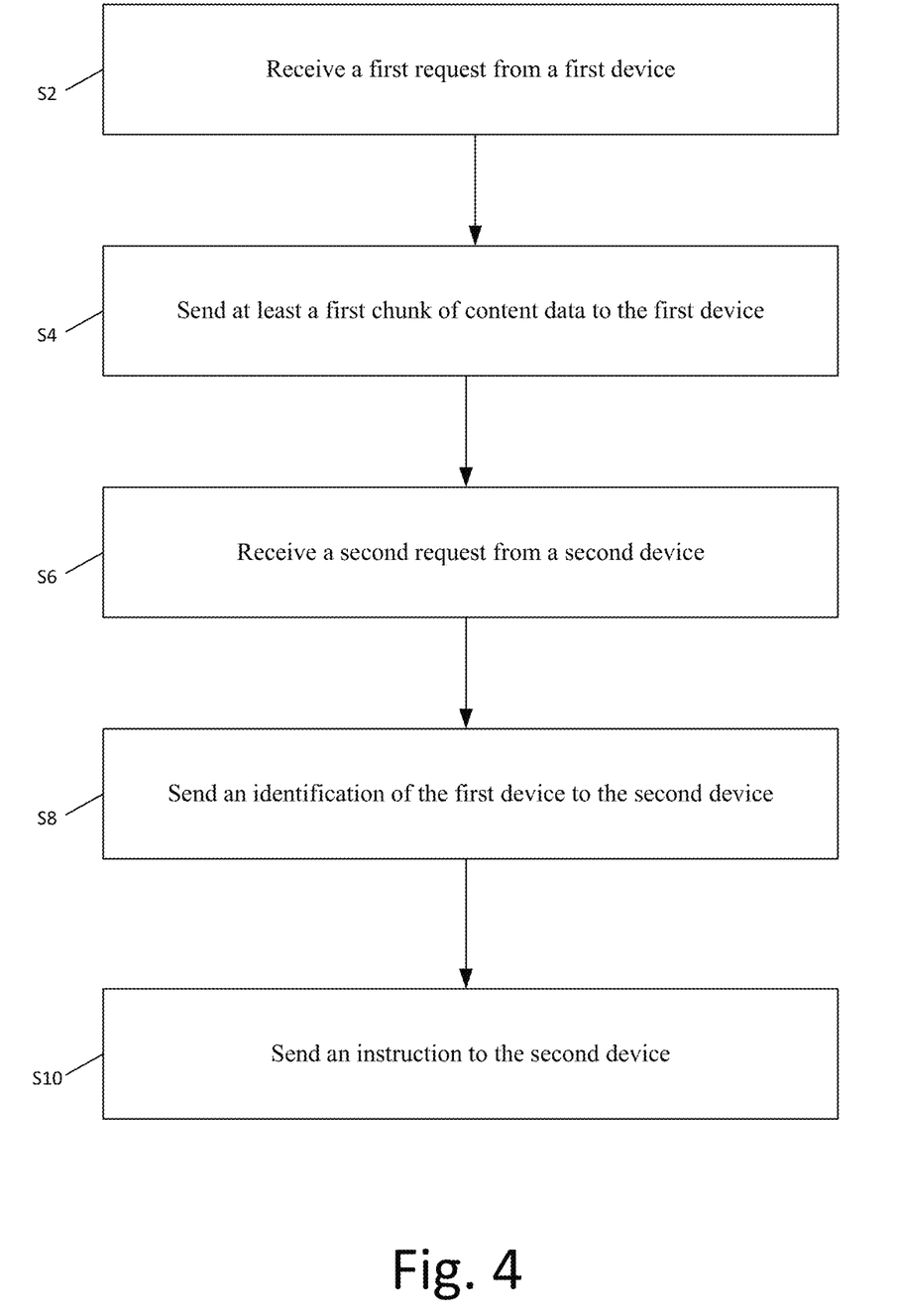
FIG. 4 illustrates a flow diagram for an example process for implementing a hybrid content delivery system.

FIG. 4 illustrates a flow diagram for an example process for implementing hybrid content delivery system, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation.

Processing may begin at block S2, "Receive a first request from a first device". At block S2, a processor may receive a first request from a first device. The first request may be a request for content. In some examples, the content may be a video.

Processing may continue from block S2 to block S4, "Send at least a first chunk of content data to the first device". At block S4, the processor may sent at least a first chunk of content data to the first device. The content data may be associated with the content.

Processing may continue from block S4 to block S6, "Receive a second request from a second device". At block S6, the processor may receive a second request from a second device. The second request may be a request for the content. The processor may determine a difference between a first receiving time of the first request and a second receiving time of the second request. The processor may identify the first device based on the difference.

Processing may continue from block S6 to block S8, "Send an identification of the first device to the second device". At block S8, the processor may send an identification of the first device to the second device. In some examples, the processor may send the identification of the first device to the second device in response to the identifying the first device.

Processing may continue from block S8 to block S10, "Send an instruction to the second device". At block S10, the processor may send an instruction to the second device. The instruction may be effective to establish a communication channel between the first device and the second device in order for a second chunk of the content data to be sent from the first device to the second device through the communication channel. The communication channel may be based on a WEB REAL-TIME COMMUNICATION protocol. In some examples, the instruction may be effective to instruct the second device to generate traffic data related to transmission of chunks of the content data among the processor, the first device, and the second device. The processor may receive the traffic data from the second device. The processor may analyze the traffic data, and based on the analysis, may send the second chunk of content data to the second device. In some examples, the instruction may be further effective to instruct the second device to analyze the traffic data, and based on the analysis, determine whether to establish the communication channel between the first device and the second device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for delivering content, the method comprising, by a processor:
   receiving a first request from a first device, wherein the first request is for the content;
   sending at least a first chunk of content data to the first device, wherein the content data is associated with the content;
   receiving a second request from a second device, wherein the second request is for the content;
   sending an identification of the first device to the second device; and
   sending an instruction to the second device, wherein the instruction is effective to establish a communication channel between the first device and the second device in order for a second chunk of the content data to be sent from the first device to the second device through the communication channel established between the first device and the second device, and wherein the communication channel is established in response to the receipt of the identification of the first device at the second device.

2. The method of claim 1, further comprising, sending, from the processor, the first chunk to the second device.

3. The method of claim 1, further comprising:
   receiving traffic data from the second device, wherein the traffic data relates to transmission of chunks of the content data among the processor, the first device, and the second device;
   analyzing the traffic data;
   generating an alert based on the analysis of the traffic data; and
   sending the alert to the second device.

4. The method of claim 3, further comprising sending, from the processor, the second chunk to the second device based on the analysis of the traffic data.

5. The method of claim 1, wherein the instruction is further effective to instruct the second device to generate traffic data related to transmission of chunks of the content data among the processor, the first device, and the second device, and based on the traffic data, determine whether to establish the communication channel between the first device and the second device.

6. The method of claim 1, wherein the communication channel is based on a web real-time communication protocol.

7. The method of claim 1, wherein the content is a video.

8. The method of claim 1, further comprising, prior to sending the identification of the first device:
   determining a difference between a first receiving time of the first request and a second receiving time of the second request;
   identifying the first device based on the difference; and
   wherein sending the identification to the second device is performed in response to identifying the first device.

9. A system effective to deliver content, the system comprising:
   a memory configured to store:
      content data associated with the content, and
      an instruction associated with an establishment of a communication channel between a first device and a second device;
   a processor configured to be in communication with the memory;
   a module configured to be in communication with the processor, the module being configured to:
      receive a first request from the first device, wherein the first request is for the content;
      instruct the processor to send at least a first chunk of the content data to the first device;
      receive a second request from the second device, wherein the second request is for the content;

send an identification of the first device to the second device; and send the instruction to the second device in order for a second chunk of the content data to be sent from the first device to the second device through the communication channel established between the first device and the second device, wherein the communication channel is established in response to the receipt of the identification of the first device at the second device.

10. The system of claim 9, wherein the module is further configured to instruct the processor to send the first chunk to the second device.

11. The system of claim 9, wherein the module is further configured to:

receive traffic data from the second device, wherein the traffic data relates to transmission of chunks of the content data among the processor, the first device, and the second device;

analyze the traffic data;

generate an alert based on the analysis of the traffic data; and send the alert to the second device.

12. The system of claim 11, wherein the module is further configured to instruct the processor to send the second chunk to the second device based on the analysis of the traffic data.

13. The system of claim 9, wherein the second device is configured to:

generate traffic data related to transmission of chunks of the content data among the processor, the first device, and the second device;

receive the instruction from the module;

analyze the traffic data based on the instruction; and based on the analysis, determine whether to establish the communication channel between the first device and the second device.

14. The system of claim 9, wherein the communication channel is based on a web real-time communication protocol.

15. The system of claim 9, wherein the content is a video.

16. A method for delivering content, the method comprising, by a processor:

receiving a first request from a first device, wherein the first request is for the content;

sending at least a first chunk of content data to the first device, wherein the content data is associated with the content;

receiving a second request from a second device, wherein the second request is for the content;

sending an identification of the first device to the second device; and sending an instruction to the second device, wherein the instruction is effective to establish a communication channel between the first device and the second device in order for a second chunk of the content data to be sent from the first device to the second device through the communication channel;

receiving traffic data from the second device, wherein the traffic data relates to transmission of chunks of the content data among the processor, the first device, and the second device;

analyzing the traffic data;

generating an alert based on the analysis of the traffic data; and sending the alert to the second device.

17. The method of claim 16, further comprising sending, from the processor, the second chunk to the second device based on the analysis of the traffic data.

18. The method of claim 16, wherein the instruction is further effective to instruct the second device to generate traffic data related to transmission of chunks of the content data among the processor, the first device, and the second device, and based on the traffic data, determine whether to establish the communication channel between the first device and the second device.

19. The method of claim 16, further comprising, prior to sending the identification of the first device:

determining a difference between a first receiving time of the first request and a second receiving time of the second request;

identifying the first device based on the difference; and wherein sending the identification to the second device is performed in response to identifying the first device.

20. A system effective to deliver content, the system comprising:

a memory configured to store:

content data associated with the content, and an instruction associated with an establishment of a communication channel between a first device and a second device;

a processor configured to be in communication with the memory;

a module configured to be in communication with the processor, the module being configured to:

receive a first request from the first device, wherein the first request is for the content;

instruct the processor to send at least a first chunk of the content data to the first device;

receive a second request from the second device, wherein the second request is for the content;

send an identification of the first device to the second device; and send the instruction to the second device in order for a second chunk of the content data to be sent from the first device to the second device through the communication channel;

wherein the second device is configured to:

generate traffic data related to transmission of chunks of the content data among the processor, the first device, and the second device;

receive the instruction from the module;

analyze the traffic data based on the instruction; and based on the analysis, determine whether to establish the communication channel between the first device and the second device.

\* \* \* \* \*